United States Patent [19]

Brüggendick

[11] Patent Number: 5,356,462
[45] Date of Patent: Oct. 18, 1994

[54] ADSORPTION MEDIUM REACTOR, ESPECIALLY FLUIDIZED BED REACTOR

[75] Inventor: Hermann Brüggendick, Schermbeck, Fed. Rep. of Germany

[73] Assignee: STEAG Aktiengesellschaft, Essen, Fed. Rep. of Germany

[21] Appl. No.: 39,397

[22] PCT Filed: Oct. 11, 1991

[86] PCT No.: PCT/EP91/01938
  § 371 Date: Apr. 16, 1993
  § 102(e) Date: Apr. 16, 1993

[87] PCT Pub. No.: WO92/06770
  PCT Pub. Date: Apr. 30, 1992

[30] Foreign Application Priority Data

Oct. 16, 1990 [DE] Fed. Rep. of Germany ....... 4032738
Aug. 7, 1991 [DE] Fed. Rep. of Germany ....... 4126146

[51] Int. Cl.$^5$ .............................................. B01D 53/08
[52] U.S. Cl. ........................................ 96/150; 96/123; 96/139; 96/152; 422/145; 422/177; 422/216; 422/239; 422/311
[58] Field of Search ................... 96/123, 139–141, 96/150, 152; 422/139, 143, 145, 177, 214, 216, 239, 311

[56] References Cited

U.S. PATENT DOCUMENTS

| | | | |
|---|---|---|---|
| 36,752 | 10/1862 | Combe | 96/152 X |
| 2,430,420 | 11/1947 | Evans | 422/216 |
| 2,715,565 | 8/1955 | McKay | 422/145 X |
| 2,843,592 | 7/1958 | Ludwig et al. | 422/311 X |
| 2,944,009 | 7/1960 | Huntley et al. | 422/139 X |
| 3,099,538 | 7/1963 | Krönig et al. | 422/139 |
| 3,505,030 | 4/1970 | Sowards | 422/311 X |
| 3,653,845 | 4/1972 | Moravec | 422/311 |
| 4,090,852 | 5/1978 | Dowd | 422/143 |
| 4,276,265 | 6/1981 | Gillespie | 422/216 X |
| 4,726,821 | 2/1988 | Sgaslik | 96/150 X |
| 4,865,819 | 9/1989 | Dowd et al. | 422/311 X |
| 4,880,604 | 11/1989 | Koves | 422/216 X |
| 5,122,346 | 6/1992 | Wormser | 422/143 X |

FOREIGN PATENT DOCUMENTS

| | | | |
|---|---|---|---|
| 0222953 | 5/1987 | European Pat. Off. | 422/311 |
| 0264669 | 9/1987 | European Pat. Off. | |
| 0376356 | 7/1989 | European Pat. Off. | |
| 1946457 | 9/1969 | Fed. Rep. of Germany | |
| 2626939 | 6/1976 | Fed. Rep. of Germany | |
| 3635571 | 10/1985 | Fed. Rep. of Germany | |
| 3817686 | 5/1988 | Fed. Rep. of Germany | |
| 3844422 | 12/1988 | Fed. Rep. of Germany | |
| 9014347 | 10/1990 | Fed. Rep. of Germany | |
| 909389 | 10/1962 | United Kingdom | 96/152 |
| 2035128 | 6/1980 | United Kingdom | |

*Primary Examiner*—Robert Spitzer
*Attorney, Agent, or Firm*—Robert W. Becker & Associates

[57] ABSTRACT

A fluid-permeable wall component of a sandwich-type construction has a slotted hole screen with substantially parallel extending vertical slot-limiting elements. A stabilizing grate is connected to the slot-limiting elements and includes connecting rods extending transverse to the slot-limiting elements and a louver-type construction with slats that extend transverse to the slot-limiting elements. The wall component is employed in an adsorption medium reactor of the fluidized bed type as a dividing wall for dividing the treatment chamber into compartments or an outer limiting wall. It retains particles of the adsorption medium within the divided compartments of the treatment chamber without obstructing the transverse fluid flow and allows separate removal of adsorption medium from either compartment.

24 Claims, 2 Drawing Sheets

ADSORPTION MEDIUM REACTOR, ESPECIALLY FLUIDIZED BED REACTOR

BACKGROUND OF THE INVENTION

The invention relates to an adsorption medium reactor, especially a fluidized bed reactor, through which the fluid to be treated is guided in a transverse flow and which has at least one substantially vertical, fluid-permeable wall. Furthermore, the invention relates to a fluid permeable wall component that is especially suitable as a wall for an adsorption medium reactor.

Adsorption medium reactors with a continuous fluidized bed or a quasi-continuously fluidized bed of a granular adsorption medium have found growing application for flue gas scrubbing. During flue gas scrubbing certain fluid flow distances and thus certain reactor cross-sections are needed. Insofar as the flue gas to be scrubbed contains highly toxic contaminants, for example, dioxines, furanes, or heavy metals, these components are already adsorptively separated in a relatively thin vertical layer of the fluidized bed column at the inflow. In conventional reactors without vertical division the entire amount of the adsorption medium contained within the reactor must be disposed of as hazardous waste after removal from the reactor, for example, must be combusted at 1200° C. and a residence time of at least two seconds. This form of disposal is extremely expensive.

From German Patent 19 46 457 a fluidized bed reactor is known in which a second row of relief sheet metal panels is provided within the reactor in addition to the inflow and outflow guide slats of a louver-type arrangement which extend substantially parallel to the inner sides of the guide slats. The relief sheet metal panels compensate a portion of the static lateral pressure of the downwardly flowing adsorbing medium and have the effect that the adsorbing medium between two guide slats is relieved of lateral pressure and can combine with the main stream of the adsorbing medium in the center of the fluidized bed.

From German Offenlegungsschrift 26 26 939 a fluidized bed reactor of the aforementioned kind is known in which in the fluidized reactor bed two adsorption medium layers are formed and are separated from one another by fluid-permeable walls. The known gas-permeable walls are in the form of plates with holes or as a louvre-type construction with oppositely slanted slats. They serve for varying the throughflow velocity of the fluid and supposedly present a compromise between a substantially complete loading of the entire adsorbing medium on the one hand and a sufficient scrubbing of the flue gas on the other hand. A reliable separation of the adsorption medium layers into layers that are greatly loaded with toxic materials and layers that are loaded to a lesser extent is not provided for in the known embodiment and is not easily achievable.

For reliably separating a fluidized bed into two or more vertical layers of varying degrees of contaminant loading, plates with holes have been used in the past. In this context relatively great openings must be provided in the dividing walls in order to reduce the risk of clogging, increase of flow resistance, and non-uniform fluid distribution over the fluidized bed. Such known walls have the disadvantage that an exact particle separation between neighboring vertical layers cannot be achieved. The known oppositely slanted louver-type constructions (German Offenlegungsschrift 26 26 939) require a substantial amount of space within the interior of the reactor and cause a relatively large collection of adsorption medium inhibiting uniform flow resistance over the height of the reactor.

It is therefore an object of the invention to provide for a simple, exactly defined separation between two vertical layers while reliably preventing a particle exchange without considerably inhibiting the fluid flow.

SUMMARY OF THE INVENTION

Inventively, this object is solved by providing the fluid-permeable wall at the inflow in the form of a slotted hole screen with slot-limiting elements extending from the top to the bottom, whereby the width of the slots is adjusted to the size of the particles of the adsorption medium such that the solid particles, with the exception of very fine particles, are retained within the inflow portion of the treatment chamber, the slotted hole screen being connected to a stabilizing grate which is comprised of connecting rods extending transverse to the slot-limiting elements, and at the outflow of the stabilizing grate a louver-type construction with transversely extending slats.

The fluid-permeable wall component in a sandwich-type construction according to the present invention is primarily characterized by:
a slotted hole screen with substantially parallel extending slot-limiting elements; and
a stabilizing grate comprising:
  a) connecting rods extending transverse to said slot-limiting elements; and
  b) a louver-type construction with slats extending transverse to said slot-limiting elements.

The stabilizing grate further comprises a plurality of connecting strips connected to the connecting rods in a crossed arrangement.

Preferably, the slot-limiting elements, the connecting bars, the connecting strips, and the edges of the slats facing the stabilizing grate are connected in an alternately perpendicularly crossed manner in the sequence given. Expediently, the slats are slanted relative to the slot-limiting elements.

In a preferred embodiment of the present invention, the slot-limiting elements are spot-welded to the connecting rods.

Preferably, the stabilizing grate further comprises substantially vertical channels, each vertical channel defines between two neighboring connecting strips and serving to remove very fine particles penetrating the wall component.

The slot-limiting elements have a substantially triangular cross-section with three sides and three corners, wherein one side forms a limiting surface of the fluid-permeable wall component and the corner opposite that side is connected to the connecting rods of the stabilizing grate.

The adsorption medium reactor with a fluidized bed for transverse flow of a fluid to be treated according to the present invention is primarily characterized by:
at least two substantially vertical fluid-permeable walls with an inflow and an outflow side, with at least one wall comprised of a fluid-permeable wall component in a sandwich-type construction, comprised of: a slotted hole screen with substantially parallel extending slot-limiting elements positioned substantially vertically and with slots between the slot-limiting elements, and a stabilizing grate.

The stabilizing grate comprises connecting rods extending transverse to the slot-limiting elements, a plurality of connecting strips connected to the connecting rods in a crossed arrangement, and a louver-type construction with slats extending transverse to the slot-limiting elements. The slats are located at the outflow side of the wall component.

The slotted hole screen is located at the inflow side and the slots have a width adapted to the size of particles of the adsorption medium such that the particles, with the exception of very fine particles, are retained by the slotted hole screen on the inflow side.

The fluid-permeable wall component can be used as a limiting wall of the reactor at the inlet or outlet side or as a dividing wall between two compartments.

The connecting strips have flat wide sides and narrow sides, the wide sides extending substantially vertically and parallel to the transverse flow of the fluid.

The slot-limiting elements have a substantially triangular cross-section with three sides and three corners, with one side positioned at the inflow side and with the corner opposite that side connected to the connecting rods of the stabilizing grate.

The stabilizing grate further comprises substantially vertical channels, each vertical channel defined between two neighboring connecting strips and serving to remove very fine particles of the adsorption medium penetrating the wall component. Preferably, a removal funnel is connected to lower ends of the vertical channels.

The slot-limiting elements are expediently straight rods,

In a preferred embodiment, the slotted hole screen is comprised of a plurality of vertical sections positioned one above the other such that a lower vertical section is overlapped by an adjacent higher positioned vertical section when viewed in the direction of transverse flow of the fluid.

The vertical sections each have an angled upper end and a flat lower end. Preferably, the stabilizing grate is comprised of individual stabilizing sections for each vertical section, wherein each stabilizing section is connected to the flat lower end of a corresponding vertical section.

The slot-limiting elements of each vertical section are aligned with the slot-limiting elements of respective neighboring vertical sections.

The slotted hole screen can limit the reactor on an outlet side thereof. Preferably, the slats are then slanted in an upward direction and are preferably slanted at an angle of between 25 to 35° to the vertical.

The stabilizing grate further comprises substantially vertically extending channels, whereby each vertical channel is defined between two neighboring connecting strips and serves to remove very fine particles of the adsorption medium that are able to penetrate the wall component. The slats are slanted such that the very fine particles of the adsorption medium are downwardly guided into the vertical channels by gravity.

In a preferred embodiment of the present invention, the fluidized bed of the reactor is divided by at least one fluid-permeable wall component into a first and a second compartment and the slats are downwardly slanted. The slats are slanted at an angle of between 15 and 25° relative to the vertical.

Preferably, a first removal device for the first compartment and a second removal device for the second compartment are provided for selectively removing the adsorption medium from and adjusting the adsorption medium in the first and the second compartments.

The fluidized bed advantageously has a first fluid-permeable wall component as an inlet and a second fluid-permeable wall component as an outlet. Preferably, the distance between the fluid-permeable wall component dividing said fluidized bed into compartments and the outlet is multiple times greater than the distance between the fluid-permeable wall component dividing the fluidized bed into compartments and the inlet.

The inventively provided combination of a slotted hole screen with a stabilizing grate extending over the entire limiting wall has considerable constructive and functional advantages within the adsorption medium reactor of the invention. The slotted hole screen essentially forms a smooth surface without discontinuities at which the particle stream of the adsorption medium can essentially flow in one plane from the top to the bottom. Particles of a standard size are retained at the inflow by the limiting wall. The fluid stream, on the other hand, is substantially uninhibited over the entire height of the limiting wall. The crossed arrangement of the slot-limiting elements, the stabilizing grate, and the slats ensures an extremely high form stability, stiffness and general stability so that the properties and the shape of the limiting wall itself is not changed when the load on both sides of the limiting wall fluctuates greatly, for example, by selectively loading or removing adsorption medium on either side of a dividing wall.

A further increase of the stability of the limiting wall can be achieved in a further embodiment of the invention by providing within the stabilizing grate on the outflow side a plurality of connecting strips which cross the connecting rods whereby the flat sides of the connecting strips extend from the top to the bottom and substantially parallel to the fluid flow direction.

A fluid-permeable wall component which is suitable as a limiting wall at the reactor outlet side as well as a dividing wall between two compartments of the reactor, is inventively characterized by a sandwich-type construction of the wall component that is constructed of: a slotted hole screen with substantially parallel extending slot-limiting elements; a stabilizing grate comprised of transverse connecting rods extending transverse to the slot-limiting elements and connecting strips spaced apart from one another and crossing the connecting rods, whereby the wide sides of the connecting strips are substantially parallel to and extend in the layering direction; and a louver-type construction with slats extending transverse to the slot-limiting elements.

Depending on the arrangement of the louver-type construction at an outer limiting wall or at a dividing wall located within the reactor itself the slats preferably have different slants. In correlation to a reactor outlet wall the slats have primarily the object to catch the very fine particles penetrating the slot-limiting elements and directly guide them, if possible, into a removal device. In this function the slats extending from the connecting strips, extend upwardly at a slant, preferably, at an angle of approximately 25 to 35° relative to the vertical plane.

When corresponding to a dividing wall, the slats of the louver-type construction are slanted in a downward direction. The angle of slant is between 15 to 25°, especially approximately 20°, relative to the vertical. This is advantageous because the angle of slant in this embodiment combines the advantages of a reliable deflection of the particle flow at the outlet side of the dividing wall and a relatively low wall thickness and compact construction.

The use of a slotted hole screen extending over the entire outflow cross-section of the reactor in connection with the stabilizing grate and substantially vertically extending connecting strips has the following advantage: On the one hand, only very fine particles can exit from the reactor chamber into the area of the louver-type construction so that the tendency for pile formation of adsorption medium is substantially decreased; on the other hand, the connecting strips, vertically extending within the stabilizing grate, facilitate the removal of very fine particles of the adsorption medium in a downward direction because they delimit vertically extending channels or chutes between the slotted hole screen on the one hand and the louver-type construction with the slanted slats on the other hand. The opening cross-section for the fluid is uniformly distributed over the entire height of the outlet side of the wall. This does not change with advancing reactor operation. Collection of adsorption medium, which in all known constructions are the cause of more or less non-uniformness within the flow resistance and thus within the flow profile of the fluid, are practically nonexisting.

As a dividing wall the inventive wall component provides the prerequisite for the adsorption medium flows to be of different velocities in both vertical chambers on either side of the wall.

The vertical layer on the inlet side which must be disposed of as hazardous waste can be almost completely loaded before removal. The adjacent at least one vertical layer within the main body of the adsorption medium fluidized bed can be removed continuously or batch-wise at a completely different removal cycle. This layer which is substantially free of any highly toxic contaminants can be disposed of with relatively simple means, can be recycled, or combusted in conventional combustion devices in an inexpensive manner.

The thickness and the cross-section of the individual compartments and thus the position of the dividing walls can be selected depending on certain contaminants, respectively, pollutants within the fluid and with respect to a desired separation characteristic. Especially, it is possible to introduce a plurality of dividing walls within the reactor such that the transversely flowing fluid flows consecutively through at least two dividing walls and three compartments. Within the individual compartments separated by dividing walls different filling materials, for example, more or less active adsorption mediums, can be used at identical or different filling heights. The invention thus can be employed independent of the transverse flow medium and the adsorption medium flow with principally the same advantages.

The distance of the at least one dividing wall to the fluid outlet wall is preferably multiple times greater than the distance to the fluid inlet wall. This has the advantage that the inlet compartment can have relatively small dimensions and the layer volume can be reduced to a size required for the adsorption of the volatile highly toxic components.

The inventive wall component can be used within an adsorption medium reactor as a limiting wall at the fluid outlet of the reactor as well as at least one dividing wall with the aforementioned advantages. On the other hand, the outlet limiting wall can also be used with an undivided reactor and, conversely, one or more dividing walls of the inventive kind can be used in connection with conventional reactors.

Advantageous further developments of the invention may be taken from the dependent claims.

BRIEF DESCRIPTION OF THE DRAWINGS

In the following, the invention will be explained in detail with the aid of the embodiment represented schematically in the drawings. The drawings show.

DESCRIPTION OF PREFERRED EMBODIMENTS

Figure 1:
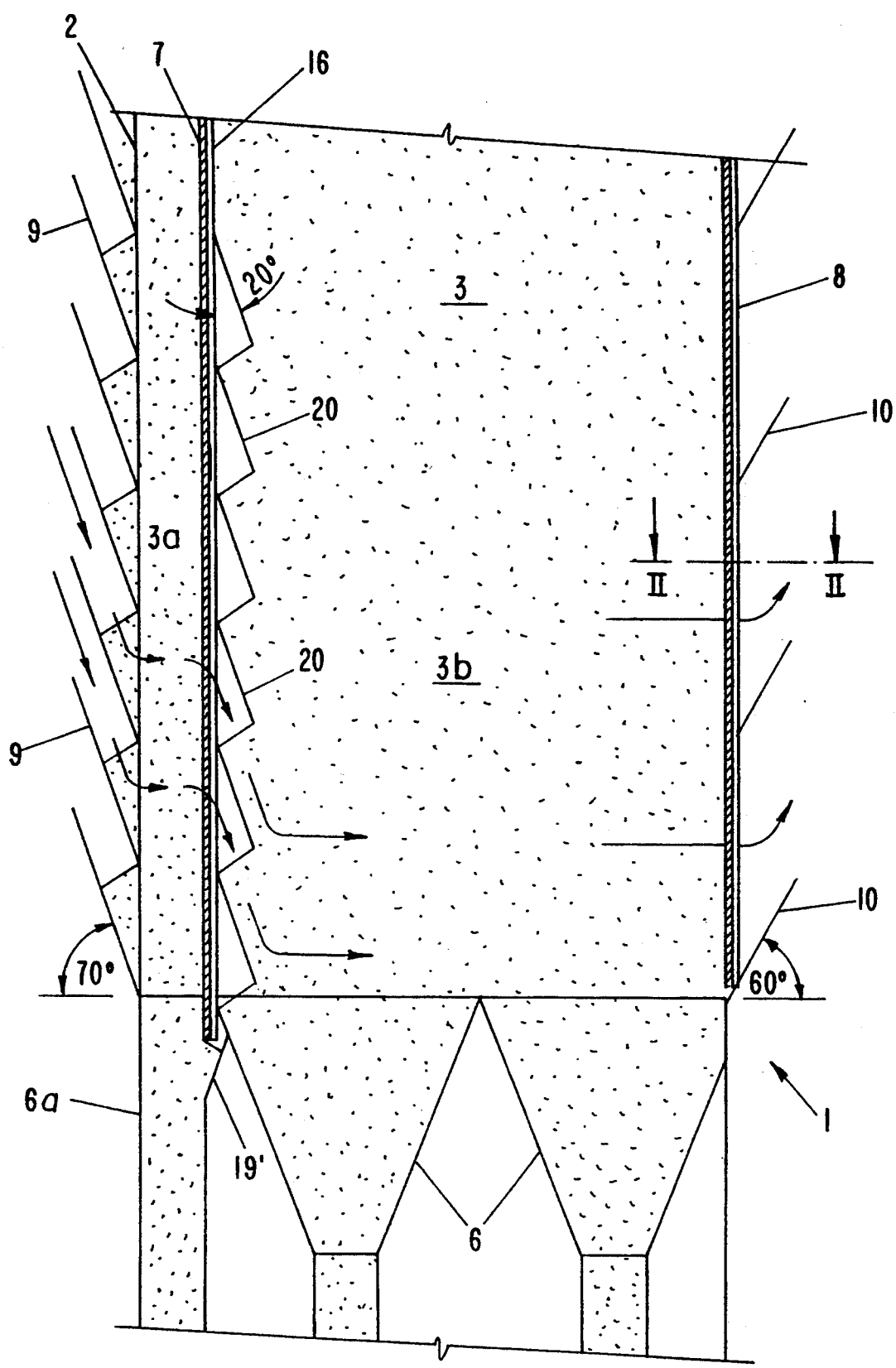
FIG. 1 a schematic vertical cross-section through a portion of a fluidized bed reactor with inventively embodied dividing and limiting walls.

FIG. 1 shows a schematic vertical cross-section through a portion of an embodiment of the adsorption medium reactor 1, called "adsorber" in the following. The adsorber 1 in the shown embodiment has a rectangular cross-section. It comprises a reaction container 2 which encloses a treatment chamber 3. The reaction container 2 comprises a supply with matrix-like arranged supply funnels for uniformly distributing the adsorption medium over the cross-section of the treatment chamber 3 and a removal bottom 6, 6a with a plurality of removal funnels for removing the adsorption medium from the treatment chamber 3.

A substantially vertically extending dividing wall 7 divides the treatment chamber 3 into two compartments 3a and 3b. The compartment 3a faces the inlet louver-type arrangement 9 and the compartment 3b extends from the outflow side of the dividing wall 7 to the oppositely arranged reactor outlet wall 8.

The fluid to be treated, in the embodiment this fluid is a flue gas, flows through the adsorber 1 in a manner indicated by dotted lines, respectively, arrows. The flue gas enters the adsorber 1 from the bottom, surrounds the removal bottom 6 with the removal funnels and the removal sockets, and enters via a gas inlet box and the inlet louver-type construction 9 over the greatest portion of the constructive height of the reaction container 2 into the inflow compartment 3a. The angle of slant of the sheet metal panels forming the inlet louver-type construction 9 is 70°+5° relative to the horizontal and the described embodiment. The fluidized bed in the treatment chamber is exposed to a fluid flow in the transverse direction, as indicated by the flow lines. The fluid exits at the outlet side through the outlet wall 8 and the louver-type construction 10 into a gas outlet box. The outlet side louver-type construction 10 is comprised of vertically stacked slats, which in the shown embodiment are slanted at an angle of 60°+5°, preferably 60° to 65°, to the horizontal.

Figure 3:
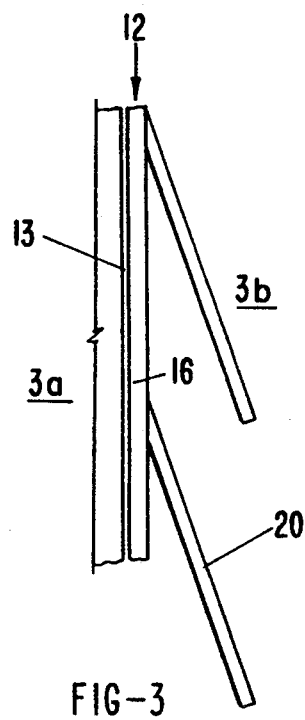
FIG. 3 a cross-sectional view, reduced relative to FIG. 2, through a portion of the dividing wall.
Figure 4:
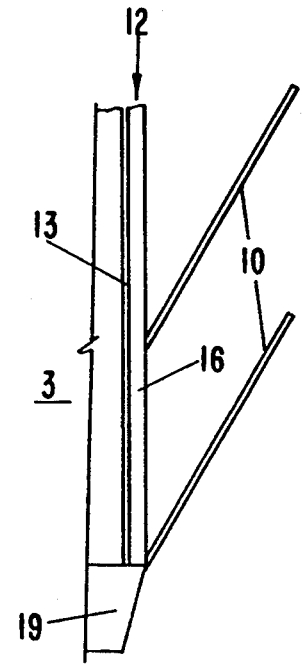
FIG. 4 a sectional view according to FIG. 3 through a portion of the reactor outlet wall according to FIG. 1.

The inventive new aspects relate especially to the design of the vertically extending dividing wall 7 in the shown embodiment and the similarly designed exit wall 8 of the reactor container These new aspects will be explained in the following with the aid of the schematic partial side views according to FIGS. 2 to 4.

Figure 2:
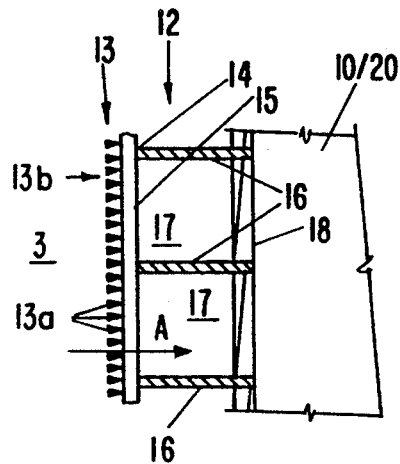
FIG. 2 a horizontal section through a portion of an inventive wall component, i.e., a dividing wall, respectively, a portion of the reactor outlet wall according to FIG. 1 with a slotted wall comprised of a slotted hole screen a stabilizing grate and a louver-type construction (section II—II of FIG. 1)

As can be seen especially in the enlarged horizontal cross-sectional view according to FIG. 2, the dividing wall 7, respectively, the wall 8 is embodied as a slotted wall. The slotted wall is comprised of an inflow slotted hole screen 13 with slot-limiting elements 13a extending from the top to the bottom and having a rod shape of a uniform triangular cross-section. The slotted hole screen 13 is connected in a sandwich-type manner to a stabilizing grate 14. For a conventional particle size of active charcoal used as an adsorption medium the slot-limiting elements 13a have a gap width of 1.25 mm+0.5 mm, a side length of the side facing the active charcoal bed of 2.2 mm+0.5 mm, and a depth to the stabilizing grate of 4.5 mm to 1.0 mm. These dimensions correspond however only to a prototype embodiment of the present invention. Especially the width of the slots 13b between two neighboring slot-limiting elements 13a depends expediently on the size of the particles of the adsorption medium which are to be retained by the slotted hole screen in the inlet compartment 3a, respectively, at the outlet wall 8 within the outlet compartment 3b.

The stabilizing grate according to FIG. 2 is comprised of connecting rods 15 which extend transversely to the slot-limiting elements 13a and is further comprised of connecting strips 16 which extend parallel to the slot-limiting elements and are spaced from one another at a greater distance. The longitudinally extending rod-shaped slot-limiting elements 13a are spot-welded to the connecting rods 15 which are spaced at a greater distance relative to one another. On the other side, the connecting strips 16 are welded to the transversely extending connecting rods 15. Additionally, the connecting strips 16 with their narrow sides facing away from the connecting rods 15 can be connected to twisted square bars 18, as shown in FIG. 2, whereby a welded connection is especially preferred. These square bars 18 and the connecting strips 16 are commercially available as a constructive unit (for different purposes), and are thus used accordingly in the present invention. The square rods 18 can also be used instead of the rectangular or round connecting rods 15.

As mentioned before, the outlet wall 8 of the reactor treatment chamber 3 in the described embodiment is provided with an approximately vertically extending slotted wall 12 substantially identical to the dividing wall 7. In this context, the adsorption medium is retained at the slotted wall 12 of both walls 7 and 8 at the inflow side at least to such an extent that its particle diameter is greater than the slot width 13b of the slotted hole screen 13. Insofar as very fine particles can penetrate the slots 13b in the direction of fluid flow (arrow A in FIG. 2), they reach vertical channels 17, positioned between the wide sides of the connecting strips 16, and fall through these (continuous) channels in a downward direction into the removal area which for the outlet wall in FIG. 4 is designated at 19. In the removal area these fine particles are either recycled into the neighboring removal funnel of the removal bottom 6 or optionally separated and removed in order to continuously reduce the technologically unfavorable dust component.

In contrast to conventional transverse flow adsorbers no substantial collection of adsorption medium can be found at the slanted louvre type slats 10 at the outlet of the reactor container 2 so that the fluid is subjected to a uniform flow resistance over the entire height of the reactor container at the outlet. Insofar the slant angle of the individual slats 10 of the louver-type arrangement is not critical; preferably, the angle of slant is however large enough in order to be able to guide the collected adsorption medium from the slats 10 into the channel 17 for removal. For this purpose, an angle of approximately 60°+5° to the horizontal plane has been proven expedient for the slats 10.

As an exception to the otherwise identical embodiment of the slotted walls 12 of the walls 7 and 8 the dividing wall 7 at the outflow side facing the compartment 3b has a different arrangement of the slats 20. The slats 20 extending from the slotted wall 12 are downwardly slanted in the direction to the compartment 3b. The angle of slant to the vertical is 20°+5° and has been proven to be expedient in order to, on the one hand, ensure a relatively free fluid flow and, on the other hand, to prevent a passage of the adsorption medium from the compartment 3b into the inflow compartment 3a in a reliable manner. The acute angle to the vertical provides for an acceptable, reduced space requirement of the wall 7 including the slats 20 within the reactor.

As can be seen in the drawings, the columns of adsorption medium within the compartments 3a and 3b divided by the wall 7 are separated from one another continuously until they reach the individually coordinated removal areas. The inflow layer within the inflow compartment 3a is provided with its own removal funnel 6a. Larger particles penetrating through the slot-limiting elements 13a from the compartment 3a fall through the channel 17 vertically downwardly when entering the space between the connecting strips 16 and are guided by the panel 19' into the removal funnel 6a. A passage of these contaminated particles into the compartment 3b is prevented. The relatively narrow adsorption medium column within the compartment 3a can be removed independently of the main bed within the compartment 3b via the removal funnel 6a and can be transferred to a suitable disposal facility, for example, can be transferred as hazardous waste to a corresponding combustion device. In this relative narrow layer practically all highly toxic components such as dioxine and furanes are adsorptively removed. After passing through the divider wall 7 the other contaminants are separated along a, for example, nine times greater travel path of the fluid through the outlet compartment 3b in an adsorptive manner. The disposal of the consumed, respectively, loaded adsorption medium of compartment 3b is relatively simple and not problematic. This adsorption medium can optionally be regenerated and recycled into the reactor container 2.

A continuous embodiment of the slot-limiting elements 13a as well as of the parallel extending connecting strips 16 which are spaced at a greater distance is preferred with respect to cost considerations. On the other hand, these vertically extending components 13a and 16 may also be assembled from a plurality of parts in an abutting fashion or by toothing together or overlapping. Especially with respect to the connecting strips 16 it is sufficient when they extend over a partial length of the reactor height such that the slats of the louver-type construction 10 can be connected thereto, especially welded thereto. A disruption of the connecting strips 16 is of no consequence for the reliable removal of the very fine particles through the channel section 17 because a particle exchange between adjacent channels 17 of the particle guidance from the top to the bottom is not adversely affected and because the slanted slats 10 have a downward orientation.

Figure 5:
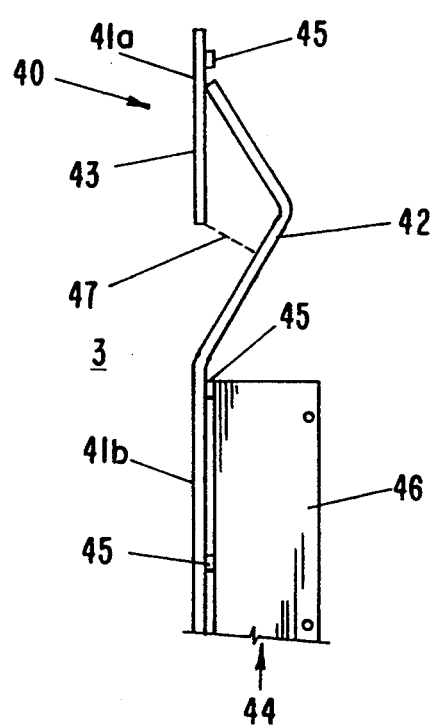
FIG. 5 a further embodiment of a slotted wall arrangement according to FIG. 4.
Figure 6:
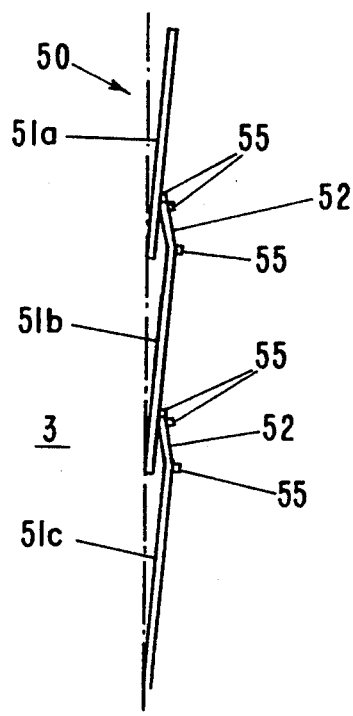
FIG. 6 a further embodiment of a slotted wall arrangement that can be used as an outlet wall of the reactor as well as a dividing wall.

FIGS. 5 and 6 show embodiments of slotted walls 40 and 50 in which the slotted hole screen is comprised of a plurality of vertical sections 41a, 41b, respectively 51a to 51c which are arranged in an overlapping fashion. In the embodiment according to FIG. 5 each slotted hole screen section at its upper end 42 is angled twice and is positioned behind the lower end 43 of the higher slotted hole screen section 41a. The individual slot-limiting rods are vertically aligned relative to one another within the overlapping slotted screen sections 41a and 41b. In the alternative embodiment according to FIG. 5 a stabilizing grate 44 with transversely extending connecting rods 45 and with connecting strips 46 delimiting removal channels 17 is provided. The connecting strips 46 however are vertically interrupted and only the planar portions of the slotted hole screen sections 41a, respectively, 41b are coordinated therewith. The slats connected to the connecting strips 46 in FIGS. 5 and 6 are not represented.

In the embodiment according to FIG. 5 the vertical limiting plane of the adsorption medium bed within the overlapping area of the slotted hole screen sections 41a and 41b is disrupted. Here small piles of adsorption medium 47 are collected. Due to the free space within the area of the overlapping portion on the other side of the collection 47 the increase of the flow resistance is of no importance. The disruption of the slot-limiting elements respectively, of the slots 13b therebetween has the advantage that especially longitudinal particles of the adsorption medium that are caught within the slots 13b, can be released from the slots and especially in the area of the collection 47 can be reoriented.

A similar effect can be achieved with the embodiment represented in FIG. 6. The effective slot-limiting elements within the slotted hole screen sections 51a to 51c extend substantially slightly slanted to the general vertical movement orientation of the adsorption medium within the treatment chamber 3. Due to the slanted orientation of the slotted hole screen sections the embodiment according to FIG. 6 is only provided with one angled portion within the overlap area 52.

For the embodiment according to FIG. 6 a stabilizing grate is coordinated with each individual slotted hole screen section 51a to 51c. Represented in FIG. 6 are only the transversely extending connecting rods 55.

Within the gist of the inventive concept a number of variations are possible. For example, the individual components belonging to the slotted wall 12 can be provided with rounded edges and, under consideration of the stabilizing requirements, can have great distances and/or a reduced wall thickness. The outflow side can optionally be horizontally curved or polygonal and can be embodied in sections. The embodiment of the louver-type arrangement is of no importance due to the special support and holding function of the slotted wall 12, 40, 50. The size of the channels should be selected such that, on the one hand, the space requirement is reduced and, on the other hand, a reliable removal of the fine particles penetrating the slotted hole screen is ensured under the force of gravity.

The present invention is, of course, in no way restricted to the specific disclosure of the specification and drawings, but also encompasses any modifications within the scope of the appended claims.

What I claim is:

1. An adsorption medium reactor with a fluidized bed for transverse flow of a fluid to be treated, said reactor comprising:
    at least two substantially vertical fluid-permeable walls with an inflow and an outflow side, with at least one said walls comprised of a fluid-permeable wall component in a sandwich-type construction, comprised of:
        a) a slotted hole screen with substantially parallel extending slot-limiting elements positioned substantially vertically and with slots between said slot-limiting elements; and
        b) a stabilizing grate comprising:
            b1) connecting rods extending transverse to said slot-limiting elements,
            b2) a plurality of connecting strips connected to said connecting rods in a crossed arrangement, and
            b3) a louver-type construction with slats extending transverse to said slot-limiting elements, said slats located at said outflow side of said wall component; and
    wherein said slotted hole screen is located at said inflow side and said slots have a width adapted to the size of particles of an adsorption medium such that the particles, with the exception of very fine particles, are retained by said slotted hole screen on said inflow side.

2. A reactor according to claim 1, wherein said connecting strips have flat wide sides and narrow sides, said wide sides extending substantially vertically and parallel to the transverse flow of the fluid.

3. A reactor according to claim 1, wherein said slot-limiting elements have a substantially triangular cross-section with three sides and three corners, with one said side positioned at the inflow side and with one said corner opposite said one side connected to said connecting rods of said stabilizing grate.

4. A reactor according to claim 1, wherein said stabilizing grate further comprises substantially vertical channels, each said vertical channel defined between two neighboring ones of said connecting strips and serving to remove very fine particles of the adsorption medium penetrating said wall component.

5. A reactor according to claim 4, further comprising a removal funnel connected to lower ends of said vertical channels.

6. A reactor according to claim 1, wherein said slot-limiting elements are straight rods.

7. A reactor according to claim 1, wherein said slotted hole screen is comprised of a plurality of vertical sections positioned one above the other such that a lower one of said vertical sections is overlapped by an adjacent higher one of said vertical sections in the direction of transverse flow of the fluid.

8. A reactor according to claim 7, wherein said vertical sections each have an angled upper end and a flat lower end.

9. A reactor according to claim 8, wherein said stabilizing grate is comprised of individual stabilizing sections for each said vertical section, wherein each said stabilizing section is connected to said flat lower end of a corresponding one of said vertical section.

10. A reactor according to claim 7, wherein said slot-limiting elements of each said vertical section are aligned with said slot-limiting elements of respective neighboring ones of said vertical sections.

11. A reactor according to claim 1, wherein said slotted hole screen limits said reactor on an outlet side thereof.

12. A reactor according to claim 11, wherein said slats are slanted in an upward direction.

13. A reactor according to claim 12, wherein said slats are slanted at an angle of between 25 to 35° to the vertical.

14. A reactor according to claim 12, wherein said stabilizing grate further comprises substantially vertical channels, each said vertical channel defined between two neighboring ones of said connecting strips and serving to remove very fine particles of the adsorption medium penetrating said wall component, and wherein said slats are slanted such that the very fine particles of the adsorption medium are guided into said channels by gravity.

15. A reactor according to claim 1, wherein said fluidized bed of said reactor is divided by at least one said fluid-permeable wall components into a first and a second compartment and wherein said slats are downwardly slanted.

16. A reactor according to claim 15, wherein said slats are slanted at an angle of between 15 and 25° relative to the vertical.

17. A reactor according to claim 15, further comprising a first removal device for said first compartment and a second removal device for said second compartment for selectively removing the adsorption medium from and adjusting the adsorption medium in said first and said second compartments.

18. A reactor according to claim 15, wherein said fluidized bed has a first said fluid-permeable wall component as an inlet and a second said fluid-permeable wall component as an outlet and wherein a first distance between said at least one fluid-permeable wall component dividing said fluidized bed and said outlet is multiple times greater than a second distance between said at least one fluid-permeable wall component dividing said fluidized bed and said inlet.

19. A fluid-permeable wall component in a sandwich-type construction, comprised of:
  a substantially vertical slotted hole screen with substantially parallel extending substantially vertical slot-limiting elements; and
  a stabilizing grate comprising:
    a) connecting rods extending transverse to said slot-limiting elements; and
    b) a louver-type construction with slats extending transverse to said slot-limiting elements, wherein said slats are slanted relative to said slot-limiting elements.

20. A fluid-permeable wall component according to claim 19, wherein said stabilizing grate further comprises a plurality of connecting strips connected to said connecting rods in a crossed arrangement.

21. A fluid-permeable wall component according to claim 20, wherein said slot-limiting elements, said connecting bars, said connecting strips, and edges of said slats facing said stabilizing grate are connected in an alternately perpendicularly crossed manner in the sequence given.

22. A fluid-permeable wall component according to claim 21, wherein said slot-limiting elements are spot-welded to said connecting rods.

23. A fluid-permeable wall component according to claim 19, wherein said stabilizing grate further comprises substantially vertical channels, each said vertical channel defined between two neighboring ones of said connecting strips and serving to remove very fine particles penetrating said wall component.

24. A fluid-permeable wall component according to claim 19, wherein said slot-limiting elements have a substantially triangular cross-section with three sides and three corners, with one said side forming a limiting surface of said fluid-permeable wall component and with one said corner opposite said one side connected to said connecting rods of said stabilizing grate.

* * * * *